(12) United States Patent
O'Connor

(10) Patent No.: US 7,363,491 B2
(45) Date of Patent: Apr. 22, 2008

(54) RESOURCE MANAGEMENT IN SECURITY ENHANCED PROCESSORS

(75) Inventor: Dennis M. O'Connor, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 701 days.

(21) Appl. No.: 10/814,691

(22) Filed: Mar. 31, 2004

(65) Prior Publication Data
US 2005/0268095 A1 Dec. 1, 2005

(51) Int. Cl.
*H04L 9/00* (2006.01)
*G06F 9/26* (2006.01)
*G06F 9/34* (2006.01)
*G06F 12/00* (2006.01)

(52) U.S. Cl. ............ 713/166; 713/164; 713/167; 711/129; 711/148; 711/153; 711/202; 711/205; 711/206; 711/207; 711/208

(58) Field of Classification Search ........ 713/200; 711/129, 148, 153, 202, 205–208
See application file for complete search history.

(56) References Cited

U.S. PATENT DOCUMENTS 4,809,160 A * 2/1989 Mahon et al. ............... 726/4
4,954,944 A * 9/1990 Ikeda ........................ 713/600
5,530,749 A * 6/1996 Easter et al. ............... 713/191
6,564,317 B1 * 5/2003 Hale et al. .................. 713/1
6,854,039 B1 * 2/2005 Strongin et al. ........... 711/163
7,124,170 B1 * 10/2006 Sibert ........................ 709/216

OTHER PUBLICATIONS

"Tablet: Personal Computer of the Year 2000," Mel et al., Communications of the ACM vol. 31 Issue 6, pp. 638-646, Jun. 1988.*
Halfhill, Tom R., "ARM Dons Armor TrustZone Security Extensions Strengthen ARMv6 Architecture", *Microprocessor Report*, www.mpronline.com, (Aug. 25, 2003),4 pages.
York, Richard , "A New Foundation for CPU Systems Security—Security Extensions to the ARM Architecture", www.arm.com/pdfs/TrustZone.pdf, (May 2003),8 pages.

* cited by examiner

*Primary Examiner*—Nasser Moazzami
*Assistant Examiner*—Oscar A Louie
(74) *Attorney, Agent, or Firm*—Dana B. Lemoine; Lemoine Patent Services, PLLC

(57) ABSTRACT

A processor divides resources into secure resources and non-secure resources. Virtual-to-physical address translation page tables may be stored in either secure or non-secure memory.

15 Claims, 6 Drawing Sheets

RESOURCE MANAGEMENT IN SECURITY ENHANCED PROCESSORS

FIELD

The present invention relates generally to processors, and more specifically to processors that divide resources into secure resources and non-secure resources.

BACKGROUND

A microprocessor may include the ability to run in various modes. For example, some processor cores licensable from ARM Holdings plc, Cambridge, UK, can run in a user mode as well as a privileged mode. Privileged mode is typically used by operating system (OS) processes, and user mode is typically used by application processes.

Processors may also include the ability to run processes in a secure mode or non-secure mode, and may be able to divide resources into secure resources and non-secure resources. For example, secure processes may be able to access secure resources, and non-secure processes may be able to access non-secure resources.

DESCRIPTION OF EMBODIMENTS

Figure 1:
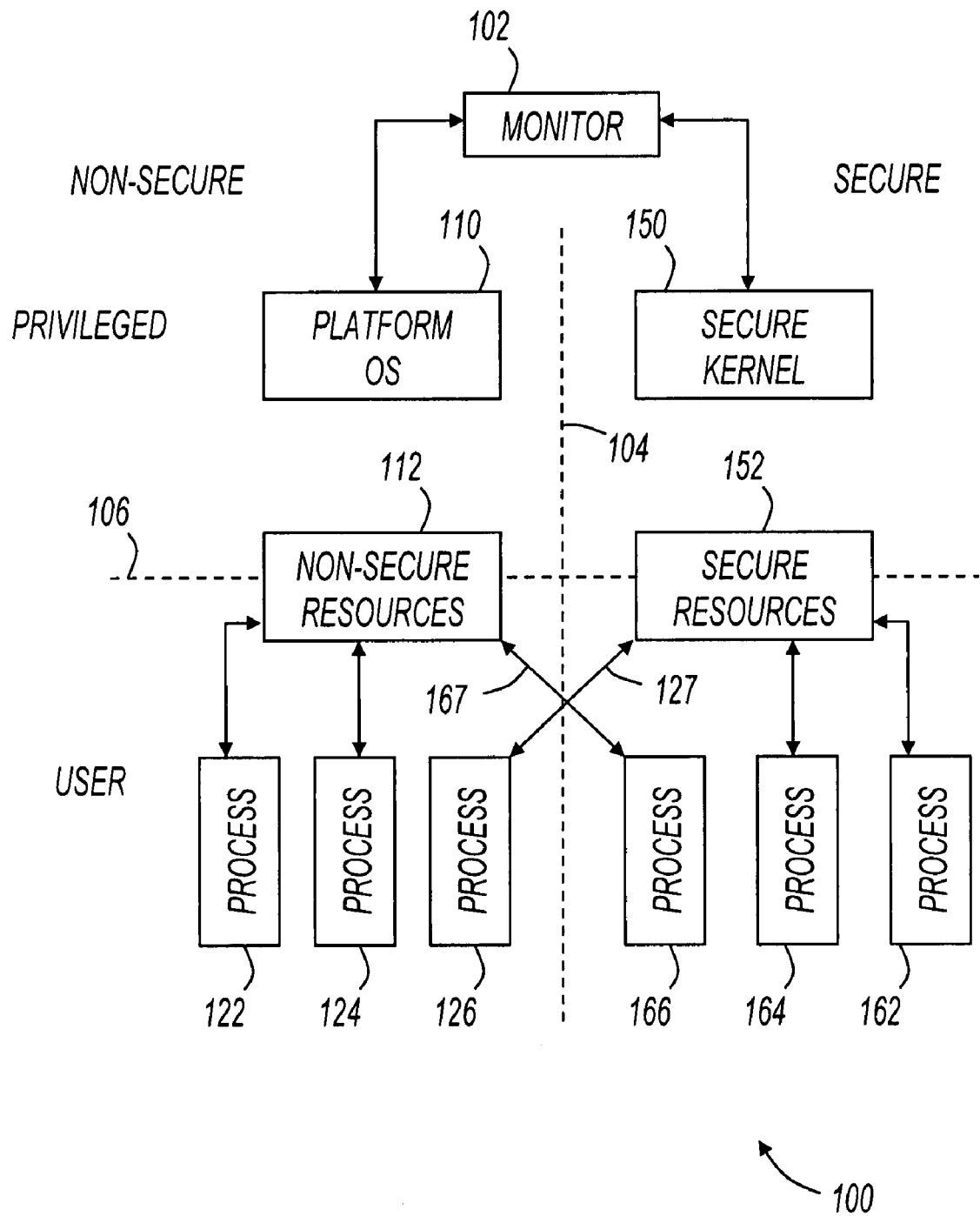
FIG. 1 shows a block diagram of a processor security structure.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a block diagram of a processor security structure. Structure 100 shows monitor 102, platform operating system (OS) 110, non-secure resources 112, non-secure processes 122, 124, and 126, secure kernel 150, secure resources 152, and secure processes 162, 164, and 166. Dividing line 106 separates privileged mode and user mode, and dividing line 104 separates secure mode and non-secure mode.

As shown in FIG. 1, secure/non-secure modes and privileged/user modes are not exclusive. For example, privileged code may run in either a secure or non-secure mode, and user code may run in either a secure or non-secure mode. In some embodiments, the privileged code that runs in non-secure mode includes a platform operating system, and the privileged code that runs in secure mode includes a secure kernel. The secure kernel may be a small trusted code base that is more easily verifiable than an entire OS. User code that runs in non-secure mode may include the bulk of the applications software that runs on the processor, and user code that runs in secure mode may include security sensitive tasks such as encryption, decryption, authentication, certificate management, and the like.

Secure resources 152 and non-secure resources 112 may be any type of resources that may be utilized by a processor. For example, resources may include memory (including cache memory, on-chip static random access memory (SRAM), tightly coupled memory (TCM), or the like), peripherals, direct memory access (DMA) controllers, input/output (I/O) interfaces, coprocessors, or any other suitable resource. In general, any resource available to a processor may be logically divided into secure and non-secure partitions.

In some embodiments, the processor transitions between non-secure mode and secure mode when a bit in a control register is set. This bit is referred to herein as the "S-bit" or "secure bit." In some embodiments, the S-bit may only be modified by platform OS 110 running in privileged mode. When the S-bit is set, monitor 102 takes control from platform OS 110.

In some embodiments, monitor 102 is a small, self-contained non-reentrant program that is independent from platform OS 110 and secure kernel 150. As long as the S-bit remains set, monitor 102 oversees all operations on the processor. Monitor 102 may perform a context switch between non-secure mode and secure mode by saving any necessary portions of the architectural state of the processor. In some embodiments, when switching to secure mode, monitor 102 may not need to flush the instruction cache, data cache, or other memory because these memories may already be divided into secure and non-secure partitions.

While the processor is in secure mode, secure resources 152 may be accessed by secure kernel 150 or secure processes 162, 164, and 166. The caches, memory management unit (MMU), translation look-aside buffers (TLB), and other structures may include additional tag bits to keep track of partitioned memory and other resources, and to enforce restrictions.

Likewise, while the processor is in non-secure mode, non-secure resources 112 may be accessed by platform OS 110 or non-secure processes 122, 124, and 126 subject to any restrictions related to privileged or user operation. In some embodiments, an attempt by a non-secure process to directly access a secure resource such as a secure memory partition may result in a program exception or other procedure that aborts the attempt.

In some embodiments, a non-secure process may access a secure resource (shown by 127), or a secure process may access a non-secure resource (shown by 167), subject to certain conditions. These resource accesses may occur without intervention by monitor 102, and therefore without the overhead of a transition between secure and non-secure modes. In some embodiments, a non-secure process may cause an architectural event that results in the use of a secure resource without transitioning to secure mode, and without incurring the associated overhead. For example, a page table for a non-secure process may be kept in a secure memory, and a translation look-aside buffer (TLB) miss caused by the non-secure process may result in a page table walk in secure memory without entering secure mode.

Figure 2:
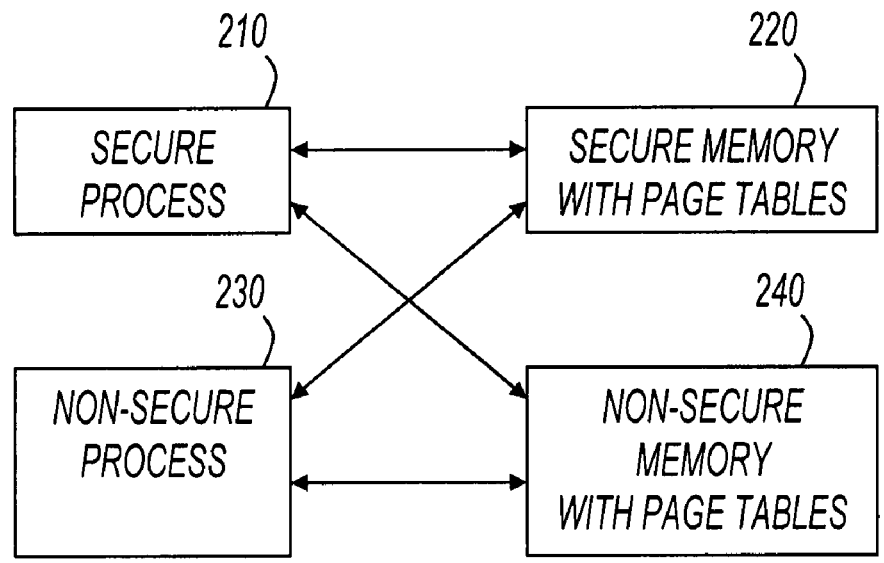
FIGS. 2 and 3 show secure and non-secure processes and memory.
Figure 3:
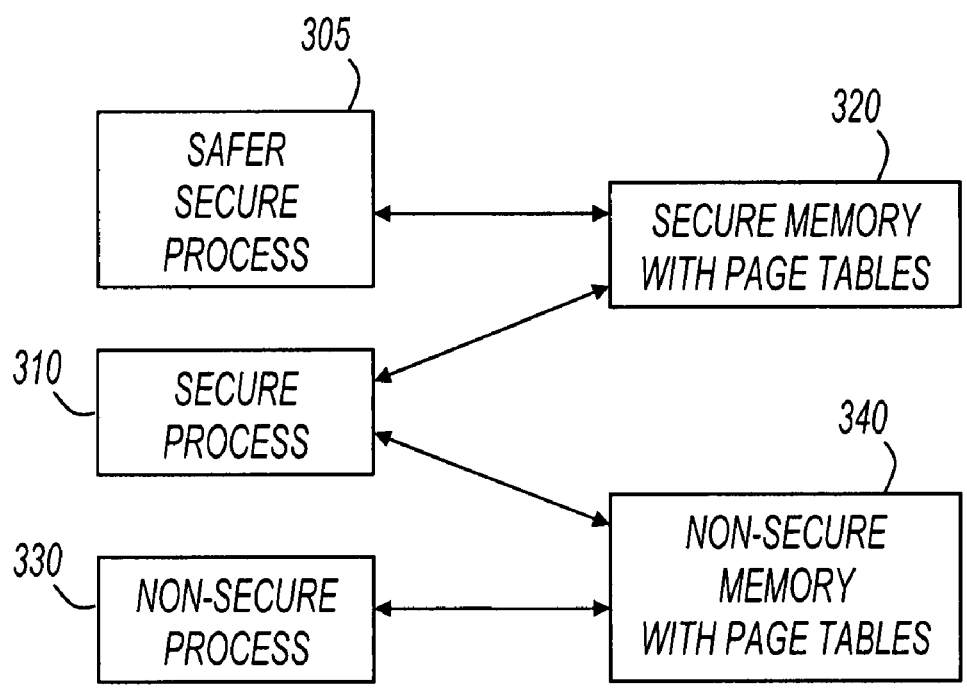

In some embodiments, additional configuration bits are kept to specify whether architectural events caused by non-secure processes may result in secure resource accesses. Further, these configuration bits may be globally applied, or may be maintained on a process-by-process basis. These control bits, along with other configuration information relating to the operation of the processor, define a "security policy" that affects the usage secure and non-secure resources. For example, a memory management unit may include one or more control registers that include bits to specify whether page tables for non-secure processes should be kept in secure or non-secure memory. Further, a control register may include control bits that specify whether page tables for secure processes may be kept in secure or non-secure memory. FIGS. 2 and 3 show various embodiments of secure and non-secure memory with page tables.

FIGS. 2 and 3 show secure and non-secure processes and memory. FIG. 2 shows secure process 210, non-secure process 230, secure memory with page tables 220, and non-secure memory with page tables 240. As discussed above, in some embodiments, control bits may exist to designate whether page tables for a non-secure process are maintained in secure or non-secure memory.

In embodiments represented by FIG. 2, memory translation for non-secure process 230 may be performed via translation tables in secure or non-secure memory. This may be dictated by the secure kernel by setting control bits in a control register to specify the location of page tables for non-secure processes. By storing non-secure page tables in secure memory, secure components of the operating system may allocate memory to non-secure processes without requiring the processor to make a transition from non-secure mode to secure mode and back again, thus improving efficiency.

In some embodiments, non-secure process 230 manages its own page tables in non-secure memory. But no non-secure process, even one managing its own page tables, may modify or read the page tables of a non-secure process that has its page tables in secure memory. In some embodiments, only a hardware-based page table walking mechanism is granted access to secure memory, and it is only given read-only access.

Secure process 210 may maintain page tables in either secure memory 220 or non-secure memory 240. In some embodiments, page tables that perform translation for secure processes are always kept in secure memory. In other embodiments, control bits in a control register are provided in the processor to allow a designer to specify where page tables for secure processes are maintained.

FIG. 3 shows secure memory 320, non-secure memory 340, secure process 310, non-secure process 330, and "safer" secure process 305. FIG. 3 reflects operation of embodiments that are capable of preventing a processor operating in secure mode from using non-secure memory when performing a page table walk. For example, a bit in a control register may be set to prevent secure processes from using non-secure memory. The operation of a hardware based page table walking mechanism may be influenced by the aforementioned control register bits, and the page table walking mechanism may enforce the restrictions.

Safer secure process 305 represents a process that has been restricted from using non-secure memory when performing a page table walk. If a TLB miss occurs while performing an address translation for safer secure process 305, the page table walking mechanism can only access secure memory.

FIGS. 2 and 3 show various restrictions that may be placed on the operation of a processor when operating in either secure or non-secure mode. For example, when in non-secure mode, the processor may be allowed to perform page table walks in either non-secure memory or secure memory, or may be restricted to only performing page table walks in either non-secure or secure memory. Also for example, when in secure mode, the processor may be allowed to perform page table walks in either non-secure memory or secure memory, or may be restricted to only performing page table walks in secure memory.

Figure 4:
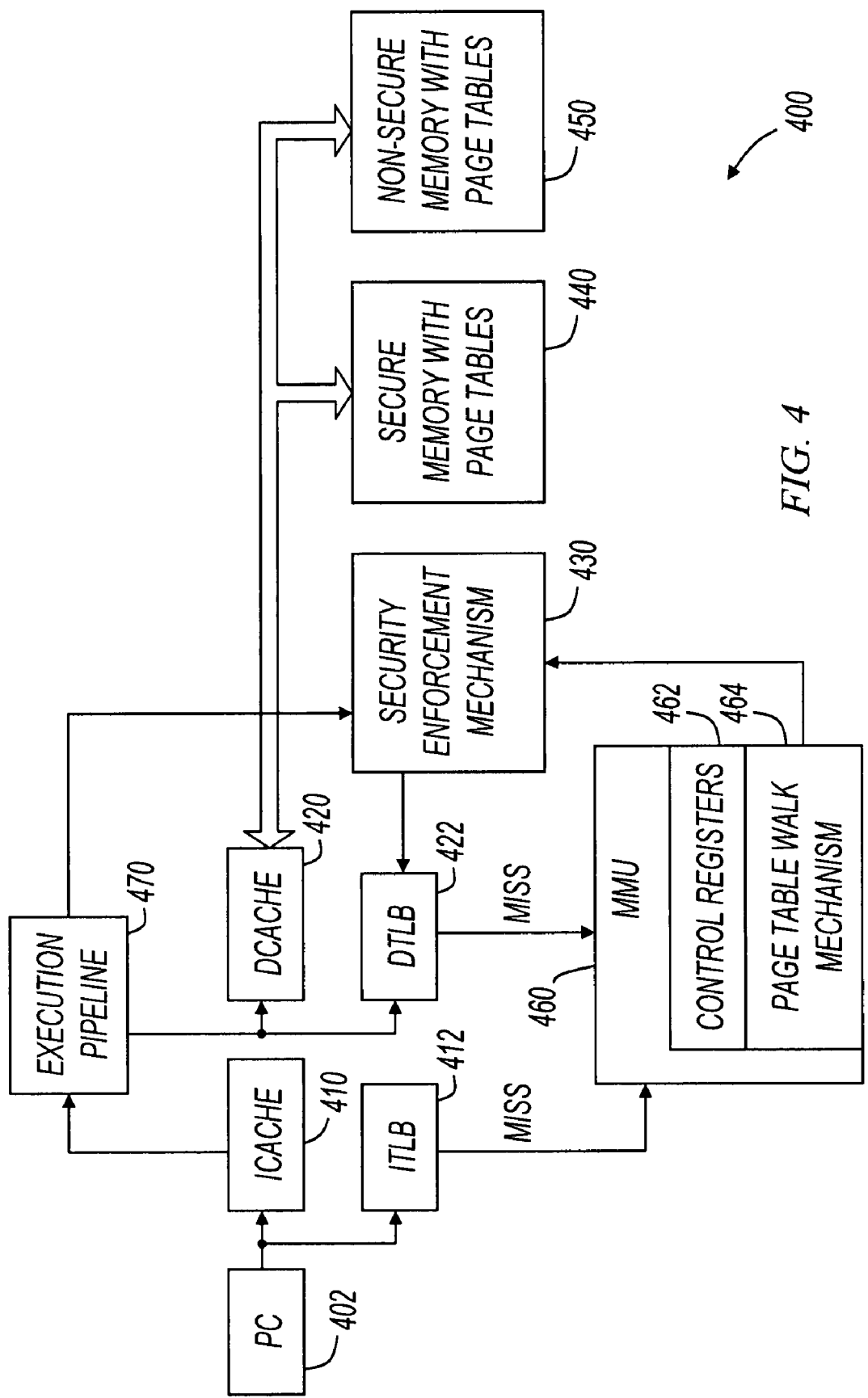
FIGS. 4 and 5 show diagrams of processors.

FIG. 4 shows a diagram of a processor. Processor 400 includes program counter (PC) 402, instruction cache (ICACHE) 410, instruction translation look-aside buffer (ITLB) 412, data cache (DCACHE) 420, and data TLB (DTLB) 422. Processor 400 also includes execution pipeline 470, security enforcement mechanism 430, secure memory 440, non-secure memory 450, and memory management unit (MMU) 460. Memory management unit 460 includes control registers 462 and page table walk mechanism 464. Processor 400 may also include many other components. For example, processor 400 may include one or more arithmetic logic units (ALUs), or the like. Also for example, processor 400 may include components to further support pipelining and instruction level parallelism (ILP). In general, processor 400 may include any hardware or software that may be useful for a processor. For simplicity and clarity, processor 400 is shown in FIG. 4 with less than all possible components. The various embodiments of the present invention are not meant to be limited in this respect.

Processor 400 may operate in any of the modes or combination of modes shown in FIG. 1. For example, processor 400 may operate in a secure mode or a non-secure mode, and may also operate in a privileged mode or user mode.

In operation, PC 402 provides an instruction address to ICACHE 410 and ITLB 412. If the addressed instruction is in ICACHE 410, then the instruction is provided to execution pipeline 470. If ITLB 412 does not include an entry for the addressed page, then a MISS is generated, and sent to MMU 460. Various possible results of an ITLB miss are discussed further below.

Execution pipeline 470 may perform operations such as instruction decoding, resolving data references, and the like. In the normal course of operation of execution pipeline 470, loads and stores of data may be executed. For example, execution pipeline 470 may load data into registers from DCACHE 420, or may store data from registers back into DCACHE 420 or a write-back buffer associated with DCACHE 420. If during one of these references, DTLB 422 does not include an entry for the addressed page, then a MISS is generated, and sent to MMU 460. Various possible results of a DTLB miss are discussed further below.

Memory management unit 460 is shown including control registers 462 and page table walking mechanism 464. In some embodiments, control registers 462 include bits to specify where page tables are maintained. For example, one or more control bits may specify that when processor 400 is operating in non-secure mode, page tables are to be accessed from non-secure memory. Also for example, one or more control bits may specify that when processor 400 is operating in non-secure mode, page tables are to be accessed from secure memory. Also for example, one or more control bits may specify that when processor 400 is operating in secure mode, page tables are to be accessed from secure memory. Any combination of operating mode and page table location may be specified by bits in control registers 462.

In some embodiments, access to control registers 462 may be restricted. For example, in some embodiments, control registers 462 may only be accessed when processor 400 is executing a monitor such as monitor 102 (FIG. 1). In other embodiments, control registers 462 may be accessed only when processor 400 is executing a monitor or a secure kernel such as secure kernel 150 (FIG. 1).

Page table walk mechanism 464 may be any hardware based mechanism useful to populate an entry in a translation look-aside buffer. For example, page table walk mechanism 464 may respond to a TLB miss by requesting that a page table be accessed. Further, page table walk mechanism 464 may directly or indirectly perform memory accesses to retrieve an entry from a page table. Page table walk mechanism 464 may access secure or non-secure memory based on the mode in which processor 400 is operating, and also based on the contents of control registers 462.

Security enforcement mechanism 430 enforces the current security policy by allowing or denying access to resources. For example, in general, security enforcement mechanism 430 denies accesses to secure resources when processor 400 is operating in non-secure mode. This may occur if execution pipeline 470 attempts to access data that is held in secure memory. In response to an illegal attempt to access secure resources, security enforcement mechanism may raise an exception or otherwise abort the attempt.

Also for example, under certain circumstances, security enforcement mechanism 430 may allow access to secure resources when processor 400 is operating in non-secure mode. This may occur when the access is a result of a TLB miss and the corresponding page tables are maintained in secure memory. In general, security enforcement mechanism 430 may determine the origin of a resource access (e.g., software originated or hardware originated), and may also determine whether the access is legal or illegal based on the current security policy.

In some embodiments, security enforcement mechanism 430 may allow a secure resource access while the processor is in non-secure mode without requiring that the processor transition to secure mode and back. For example, if a TLB miss occurs when processor 400 is operating in non-secure mode, and the current security policy allows non-secure process page tables in secure memory, then security enforcement mechanism 430 may allow a secure memory access to occur while processor 400 is operating in non-secure mode.

Secure memory with page tables 440 and non-secure memory with page tables 450 are shown coupled to DCACHE 420 to signify that a DTLB miss may result in a page table access in either secure memory or non-secure memory based on the current security policy. Page tables from either memory 440 or memory 450 may also be used to populate ICACHE 410 and ITLB 412. The physical memory represented by memories 440 and 450 may be one memory device that is logically partitioned, or may be separate physical memory devices. Further, memory 440 and 450 may or may not be part of processor 400. For example, memory 440 and 450 may be on-chip SRAM or may be off-chip memory such as SRAM or dynamic random access memory (DRAM). The various embodiments of the present invention are not limited by the type or location of memories 440 and 450.

Figure 5:
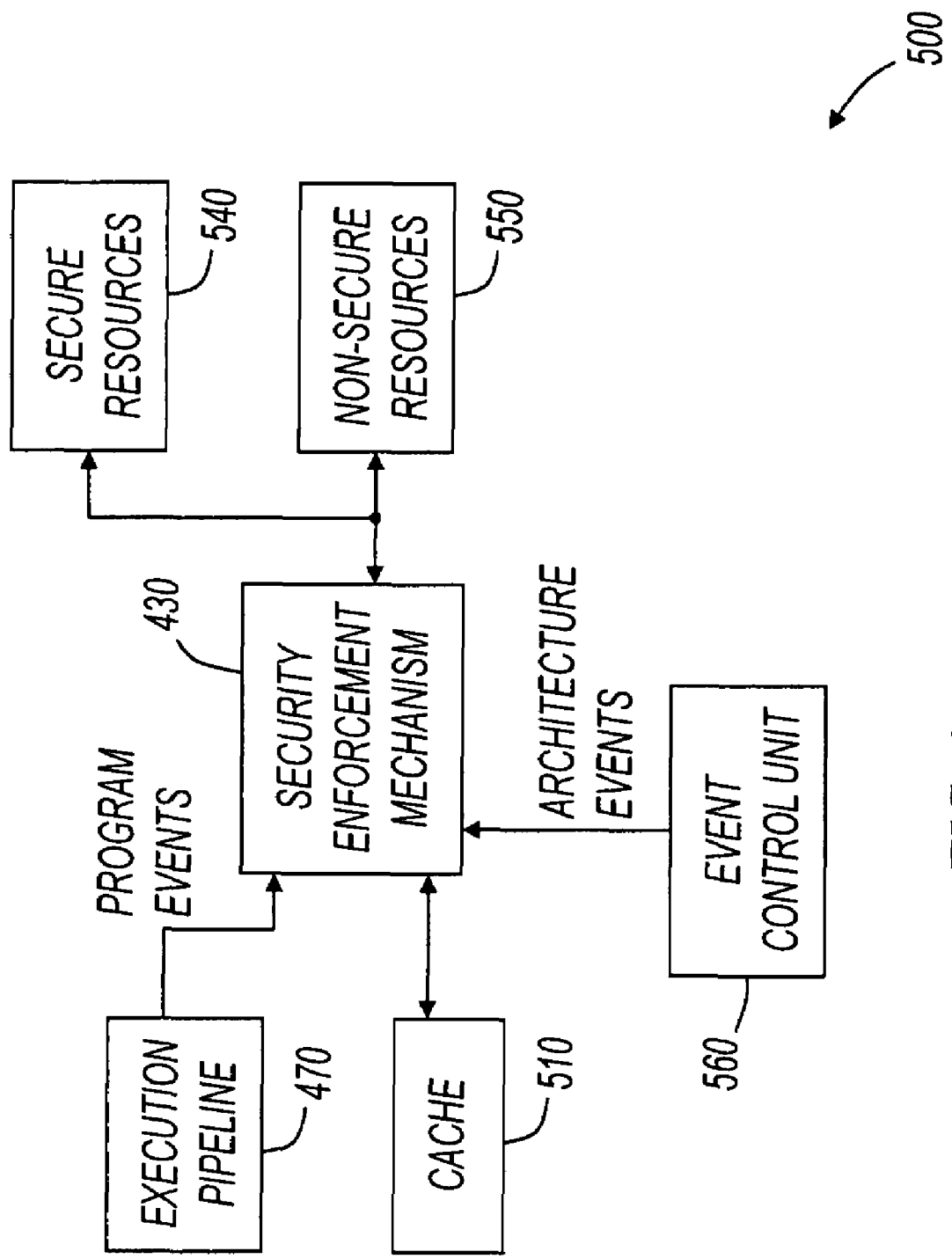

FIG. 5 shows a diagram of a processor. Processor 500 includes cache 510, execution pipeline 470, security enforcement mechanism 430, secure resources 540, non-secure resources 550, and event control unit 560. Processor 500 may also include many other components. For example, processor 500 may include one or more arithmetic logic units (ALUs), or the like. Also for example, processor 500 may include components to further support pipelining and instruction level parallelism (ILP). In general, processor 500 may include any hardware or software that may be useful for a processor. For simplicity and clarity, processor 500 is shown in FIG. 5 with less than all possible components. The various embodiments of the present invention are not meant to be limited in this respect.

Processor 500 may operate in any of the modes or combination of modes shown in FIG. 1. For example, processor 500 may operate in a secure mode or a non-secure mode, and may also operate in a privileged mode or user mode. Secure resources 540 and non-secure resources 550 may include any type of resources available to processor 500. For example, resources may include, but are not limited to: memory, peripherals, direct memory access (DMA) controllers, input/output (I/O) interfaces, coprocessors, or any other suitable resource. In general, any resource available to a processor may be logically divided into secure and non-secure partitions.

In operation, execution pipeline 470 causes "program events" and provides an indication of the program events to security enforcement mechanism 430. As used herein, "program events" refers to any action caused by a program executing on processor 500. Examples of program events include loads and stores of data, and resource accesses under program control.

Event control unit 560 provides an indication of "architecture events" to security enforcement mechanism 430. As used herein, "architecture events" refers to any event that results from an architectural state of processor 500. An architectural event may be indirectly caused by a program. For example, a TLB miss is an architectural event that results from a program attempting to access a memory location for which there is no corresponding TLB entry. Other examples of architectural events include interrupts, program faults, and debug operations.

In some embodiments, security enforcement mechanism 430 is capable of differentiating between program events and architectural events, and providing access to secure or non-secure resources based on a current security policy. For example, a current security policy may allow access to particular secure resources that result from architectural events while processor 500 is operating in secure mode. The same security policy may restrict access to other secure resources while processor 500 is operating in secure mode.

By differentiating between program events and architectural events, and allowing access to secure or non-secure resources based on a current security policy, processor 500 may allow for access to secure resources that might otherwise require a costly transition from non-secure mode to secure mode, and back again.

Processors, MMUs, security enforcement mechanisms, registers, and other embodiments of the present invention can be implemented in many ways. In some embodiments, they are implemented in integrated circuits. In some embodiments, design descriptions of the various embodiments of the present invention are included in libraries that enable designers to include them in custom or semi-custom designs. For example, any of the disclosed embodiments can be implemented in a synthesizable hardware design language, such as VHDL or Verilog, and distributed to designers for inclusion in standard cell designs, gate arrays, custom devices, or the like. Likewise, any embodiment of the present invention can also be represented as a hard macro targeted to a specific manufacturing process. For example, processor 400 may be represented as polygons assigned to layers of an integrated circuit.

Figure 6:
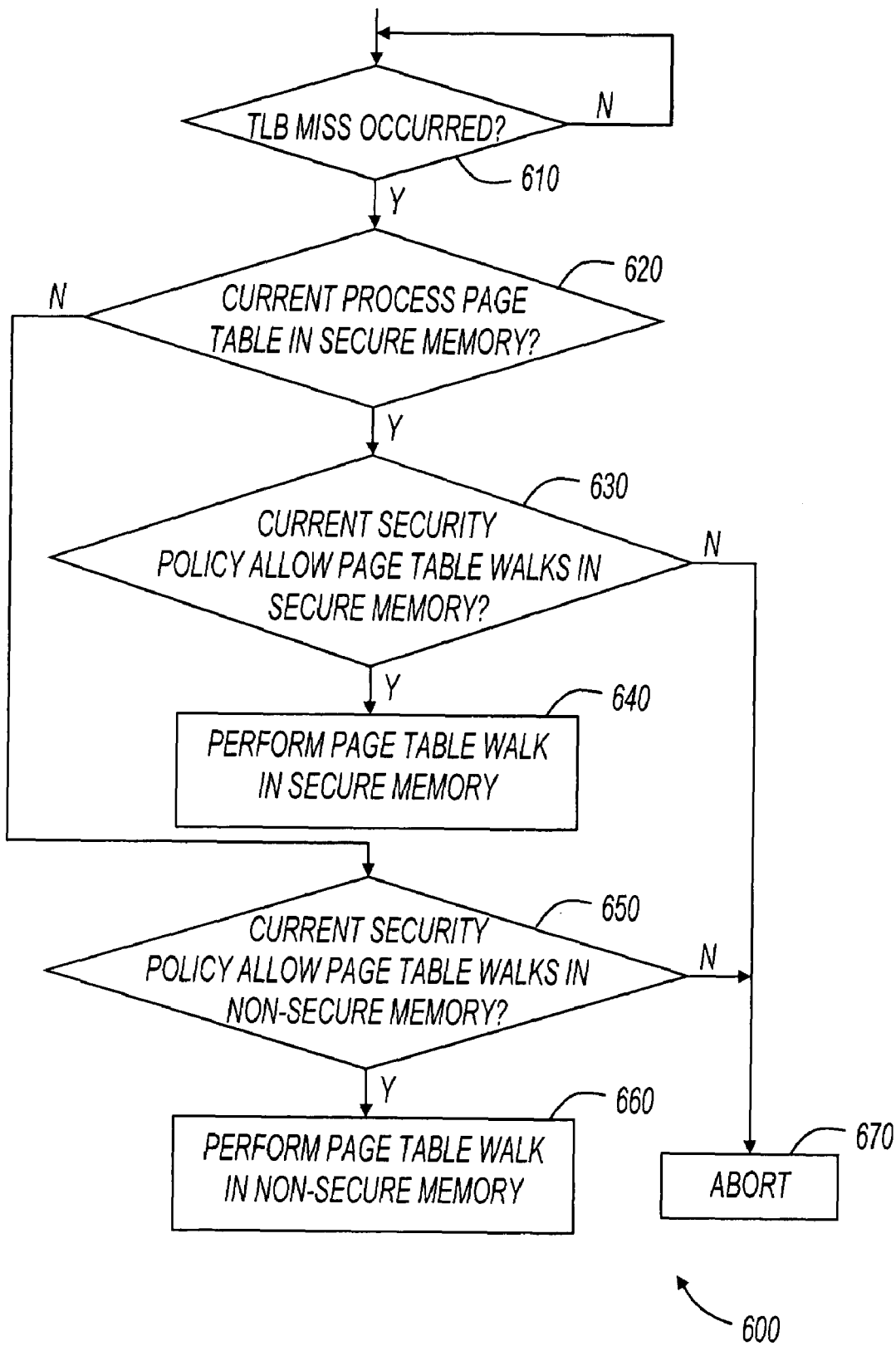
FIG. 6 shows a flowchart in accordance with various embodiments of the present invention.

FIG. 6 shows a flowchart in accordance with various embodiments of the present invention. In some embodiments, method 600, or portions thereof, is performed by a processor or a security enforcement mechanism within a processor, embodiments of which are shown in the various figures. In other embodiments, method 600 is performed by a control circuit, an integrated circuit, or an electronic system. Method 600 is not limited by the particular type of apparatus or software element performing the method. The various actions in method 600 may be performed in the order presented, or may be performed in a different order. Further, in some embodiments, some actions listed in FIG. 6 are omitted from method 600.

Method 600 is shown beginning with block 610. At 610, If a TLB miss has occurred, then method 600 determines if the current process page table is in secure memory at 620. If the current process page table is in secure memory, then method 600 determines if the current security policy allows page table walks in secure memory at 630. For example, a control register such as control register 462 (FIG. 4) may set a security policy that allows a non-secure process to have page tables maintained in secure memory.

If page tables are in secure memory, and the current security policy allows page table walks in secure memory, then a page table walk is performed in secure memory at 640. If the current security policy does not allow page table walks in secure memory, then method 600 is aborted at 670. The abort may be performed in many different ways, include raising a hardware or software exception in the processor performing method 600.

If the current process page table is in non-secure memory, then method 600 determines if the current security policy allows page table walks in non-secure memory at 650. For example, a control register such as control register 462 (FIG. 4) may set a security policy that allows a non-secure process to have page tables maintained in non-secure memory.

If page tables are in non-secure memory, and the current security policy allows page table walks in non-secure memory, then a page table walk is performed in non-secure memory at 660. If the current security policy does not allow page table walks in non-secure memory, then method 600 is aborted at 670.

In some embodiments, method 600 is performed when a processor is operating in non-secure mode, and in other embodiments, method 600 is performed when a processor is operating in secure mode. Further, method 600 may be performed when a processor is in either privileged mode or user mode.

Figure 7:
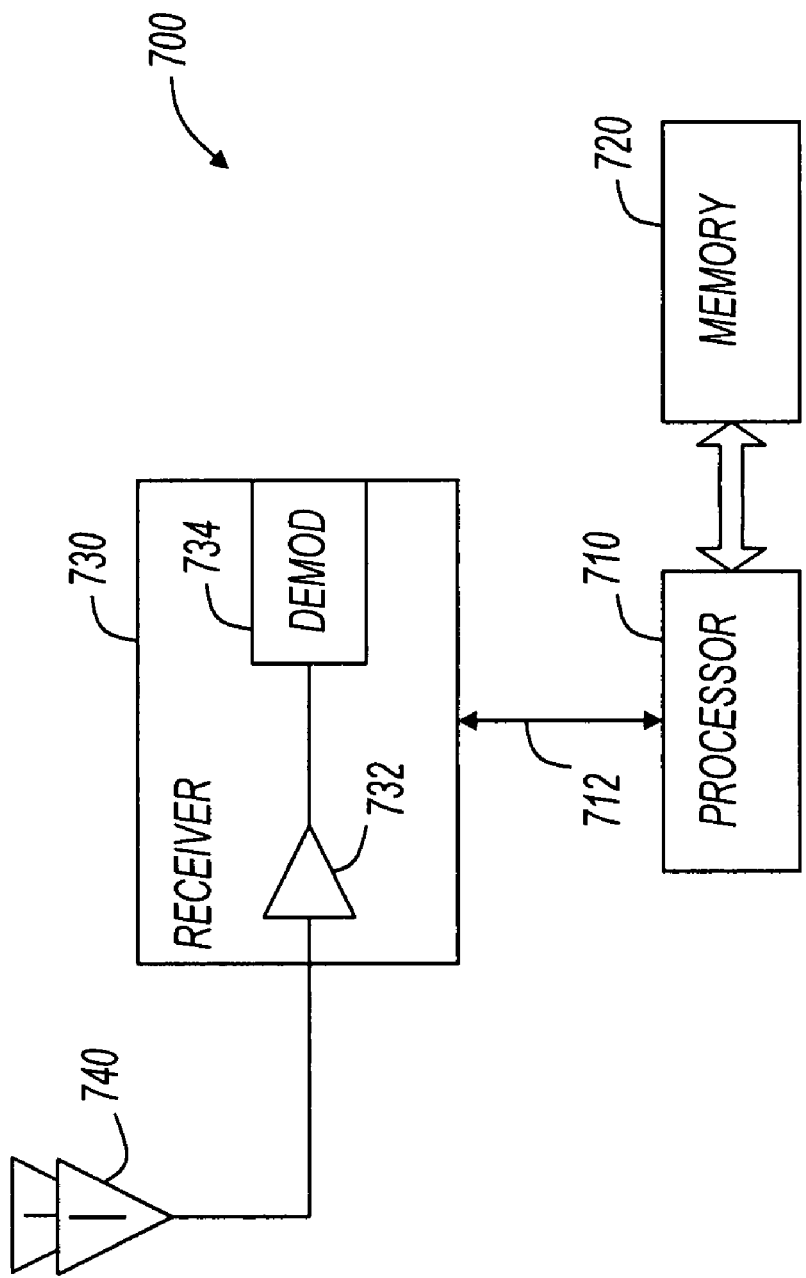
FIG. 7 shows a system diagram in accordance with various embodiments of the present invention.

FIG. 7 shows a system diagram in accordance with various embodiments of the present invention. FIG. 7 shows system 700 including processor 710, memory 720, receiver 730, and antennas 740. Processor 710 may be a processor capable of operating in a secure or non-secure mode as described with reference to the various embodiments of the invention. Further, processor 710 may be a processor that allows access to secure or non-secure resources based on a security policy with necessarily performing a transition from non-secure mode to secure mode and back again.

In systems represented by FIG. 7, processor 710 is coupled to receiver 730 by conductor 712. Receiver 730 receives communications signals from antennas 740 and also communicates with processor 710 on conductor 712. In some embodiments, receiver 730 provides communications data to processor 710. Also in some embodiments, processor 710 provides control information to receiver 730 on conductor 712.

Example systems represented by FIG. 7 include cellular phones, personal digital assistants, wireless local area network interfaces, and the like. Many other systems uses for processor 710 exist. For example, processor 710 may be used in a desktop computer, a network bridge or router, or any other system without a receiver.

Receiver 730 includes amplifier 732 and demodulator (demod) 734. In operation, amplifier 732 receives communications signals from antennas 740, and provides amplified signals to demod 734 for demodulation. For ease of illustration, frequency conversion and other signal processing is not shown. Frequency conversion can be performed before or after amplifier 732 without departing from the scope of the present invention. In some embodiments, receiver 730 may be a heterodyne receiver, and in other embodiments, receiver 730 may be a direct conversion receiver. In some embodiments, receiver 530 may include multiple receivers. For example, in embodiments with multiple antennas 740, each antenna may be coupled to a corresponding receiver.

Receiver 730 may be adapted to receive and demodulate signals of various formats and at various frequencies. For example, receiver 730 may be adapted to receive time domain multiple access (TDMA) signals, code domain multiple access (CDMA) signals, global system for mobile communications (GSM) signals, orthogonal frequency division multiplexing (OFDM) signals, multiple-input-multiple-output (IMO) signals, spatial-division multiple access (SDMA) signals, or any other type of communications signals. The present invention is not limited in this regard.

Antennas 740 may include one or more antennas. For example, antennas 740 may include a single directional antenna or an omni-directional antenna. As used herein, the term omni-directional antenna refers to any antenna having a substantially uniform pattern in at least one plane. For example, in some embodiments, antennas 740 may include a single omni-directional antenna such as a dipole antenna, or a quarter wave antenna. Also for example, in some embodiments, antennas 740 may include a single directional antenna such as a parabolic dish antenna or a Yagi antenna. In still further embodiments, antennas 740 include multiple physical antennas. For example, in some embodiments, multiple antennas are utilized to multiple-input-multiple-output (MIMO) processing or spatial-division multiple access (SDMA) processing.

Memory 720 represents an article that includes a machine readable medium. For example, memory 720 represents any one or more of the following: a hard disk, a floppy disk, random access memory (RAM), read only memory (ROM), flash memory, CDROM, or any other type of article that includes a medium readable by processor 710. Memory 720 can store instructions for performing the execution of the various method embodiments of the present invention.

In operation, processor 710 reads instructions and data from memory 720 and performs actions in response thereto. For example, processor 710 may access instructions from memory 720 and communicate with receiver 730 using conductor 712. Receiver 730 may receive data from processor 710 and provide it to other circuits within receiver 730. Receiver 730 may also receive data from various circuits within receiver 730 and provide it to processor 710. For example, demod 734 may receive control data from processor 710 and may also provide data to processor 710.

Although processor 710 and receiver 730 are shown separate in FIG. 7, embodiments exist that combine the circuitry of processor 710 and receiver 730 in a single integrated circuit. Furthermore, receiver 730 can be any type of integrated circuit capable of processing communications signals. For example, receiver 730 can be an analog integrated circuit, a digital signal processor, a mixed-mode integrated circuit, or the like.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. A processor comprising:
    a mechanism to identify memory as secure memory accessible by secure processes, and to identify non-secure memory accessible by both secure and non-secure processes;
    a security enforcement mechanism to allow page tables for the non-secure processes to be stored in secure memory; and
    a translation look-aside buffer (TLB), wherein the security enforcement mechanism allows a page table access in secure memory while the processor remains in a non-secure mode after a TLB miss in a non-secure process;
    wherein the security enforcement mechanism includes page table walk hardware configured to walk page tables in secure memory in response to architecture events other than TLB misses caused by non-secure processes.

2. A processor comprising:
    a mechanism to identify memory as secure memory accessible by secure processes, and to identify non-secure memory accessible by both secure and non-secure processes;
    a security enforcement mechanism to allow page tables for the non-secure processes to be stored in secure memory; and
    a translation look-aside buffer (TLB), wherein the security enforcement mechanism allows a page table access in secure memory while the processor remains in a non-secure mode after a TLB miss in a non-secure process;
    wherein the security enforcement mechanism includes circuits to differentiate between program generated memory accesses and architecture generated memory accesses, and to block program generated memory access from accessing secure memory.

3. The processor of claim 2 further comprising virtual address translation hardware to perform virtual address translation for non-secure processes via page tables in secure memory.

4. The processor of claim 2 further comprising a control register to specify whether page tables for non-secure processes are kept in secure memory or non-secure memory.

5. The processor of claim 2 further comprising page table walk hardware configured to access secure memory on behalf of non-secure processes.

6. An electronic system comprising:
    a plurality of antennas;
    an amplifier coupled to at least one of the plurality of antennas to amplify communications signals;
    a processor coupled to the amplifier; and
    memory that can be partitioned by the processor into secure memory accessible by secure processes and non-secure memory accessible by secure or non-secure processes;
    wherein the processor includes a security enforcement mechanism to allow page tables for non-secure processes to be stored in secure memory, and the processor includes a translation look-aside buffer (TLB), wherein the security enforcement mechanism allows a page table access in secure memory while the processor remains in a non-secure mode after a TLB miss in a non-secure process, and wherein the security enforcement mechanism includes page table walk hardware configured to walk page tables in secure memory in response architecture events other than TLB misses caused by non-secure processes.

7. The electronic system of claim 6 wherein the processor further includes a control register to specify whether page tables for non-secure processes are kept in secure memory or non-secure memory.

8. The electronic system of claim 6 wherein the processor further includes page table walk hardware configured to access secure memory on behalf of non-secure processes.

9. A processor comprising:
    secure memory accessible when the processor is in a privileged secure mode or a user secure mode;
    non-secure memory accessible when the processor is in a privileged non-secure mode or a user non-secure mode; and
    a security enforcement mechanism that allows access to page tables in secure memory when a translation look-aside buffer (TLB) miss occurs in the user non-secure mode, wherein the access to the page table occurs without the processor leaving the user non-secure mode, and wherein the security enforcement mechanism is configured to allow access to page tables in secure memory when a translation look-aside buffer (TLB) miss occurs in the privileged non-secure mode, wherein the access to the page table occurs without the processor leaving the privileged non-secure mode.

10. The processor of claim 9 further comprising a memory management unit to access the page table while the processor remains in the user non-secure mode.

11. The processor of claim 9 further comprising a control register to specify whether page tables for non-secure processes are kept in secure memory or non-secure memory.

12. The processor of claim 9 further comprising page table walk hardware configured to access secure memory on behalf of non-secure processes.

13. A processor comprising:
    secure memory accessible when the processor is in a privileged secure mode or a user secure mode;
    non-secure memory accessible when the processor is in a privileged non-secure mode or a user non-secure mode; and
    a security enforcement mechanism that allows access to page tables in secure memory when a translation look-aside buffer (TLB) miss occurs in the user non-secure mode, wherein the access to the page table occurs without the processor leaving the user non-secure mode and wherein the security enforcement mechanism includes circuits to differentiate between program generated memory accesses and architecture generated memory accesses, and to block program generated memory access from accessing secure memory when the processor is in the privileged non-secure mode or the user non-secure mode.

14. The processor of claim 13 further comprising a control register to specify whether page tables for non-secure processes are kept in secure memory or non-secure memory.

15. The processor of claim 13 further comprising page table walk hardware configured to access secure memory on behalf of non-secure processes.

* * * * *